Feb. 17, 1970        J. F. ENGLE ET AL        3,495,298
DIFFERENTIAL LUBRICATING MECHANISM
Filed Nov. 30, 1967                            3 Sheets-Sheet 1
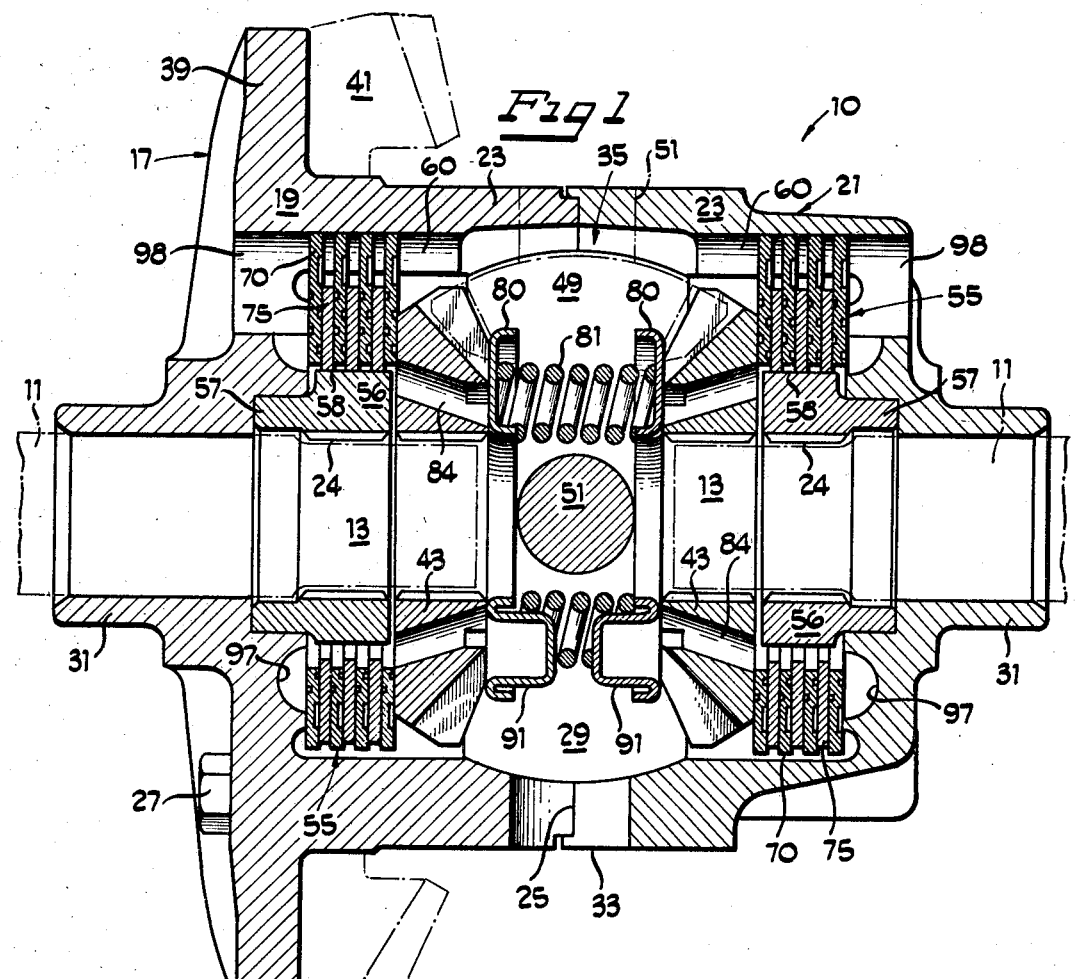
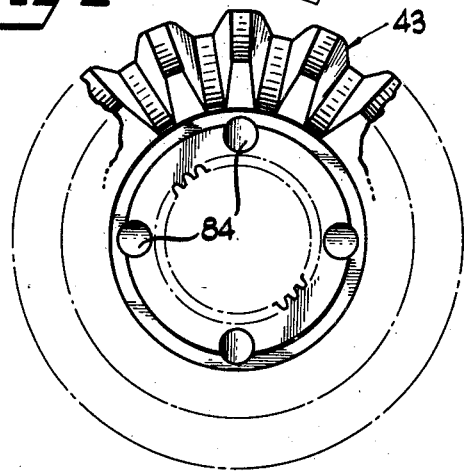
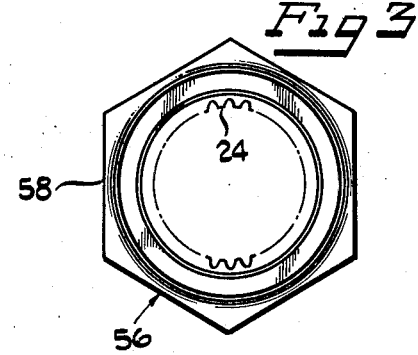
INVENTORS
WILLIAM G. JEAKLE
JACK F. ENGLE
BY Robert L. Zieg
ATTORNEY Feb. 17, 1970  J. F. ENGLE ET AL  3,495,298
DIFFERENTIAL LUBRICATING MECHANISM
Filed Nov. 30, 1967  3 Sheets-Sheet 2

INVENTORS
WILLIAM G. JEAKLE
JACK F. ENGLE

BY Robert L. Zieg
ATTORNEY

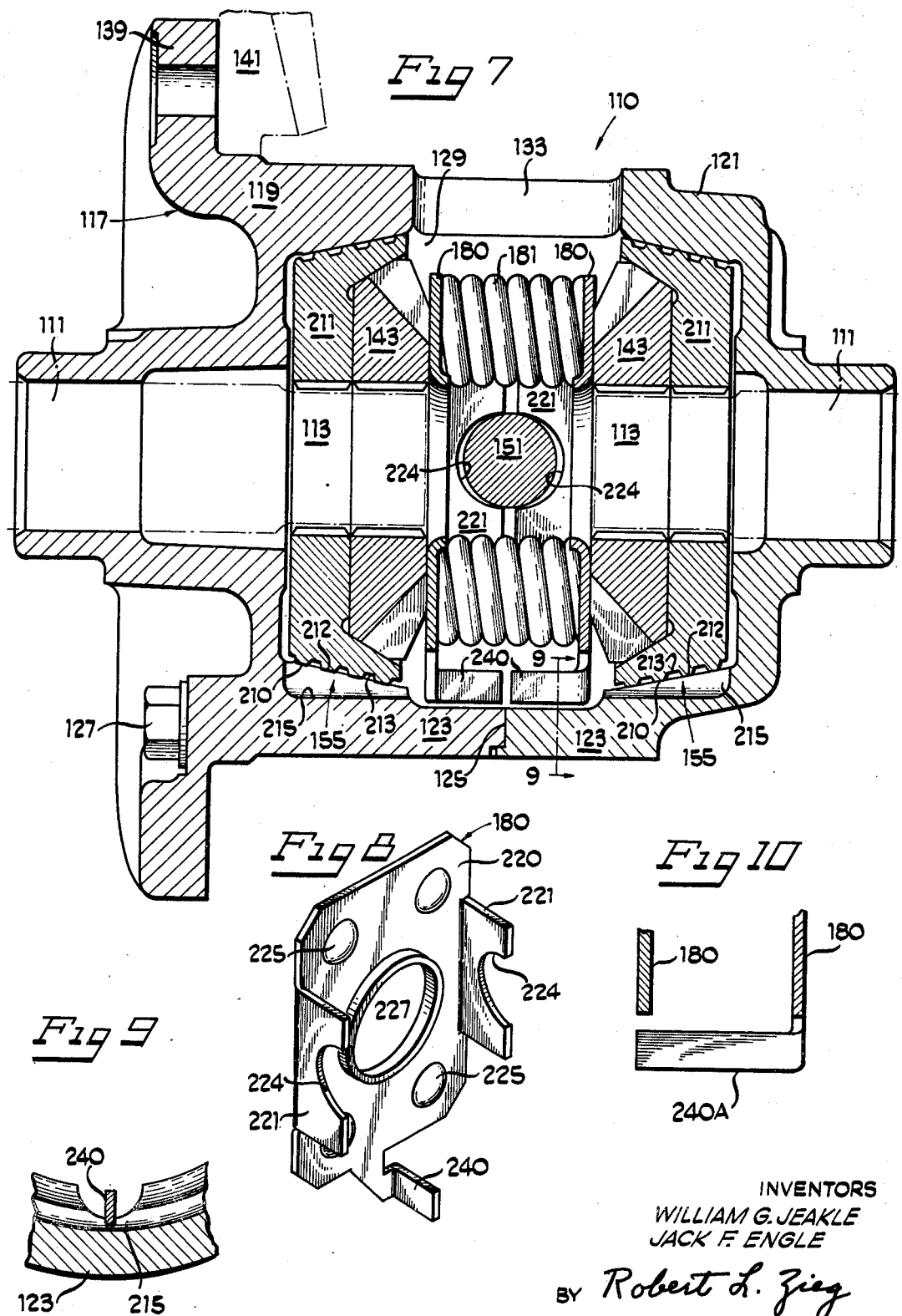

United States Patent Office
3,495,298
Patented Feb. 17, 1970

3,495,298
DIFFERENTIAL LUBRICATING MECHANISM
Jack F. Engle and William G. Jeakle, Auburn, Ind., assignors to Borg-Warner Corporation, Chicago, Ill., a corporation of Illinois
Filed Nov. 30, 1967, Ser. No. 686,935
Int. Cl. F01m 1/00, 9/06; F16h 1/44
U.S. Cl. 184—6        13 Claims

ABSTRACT OF THE DISCLOSURE

A limited slip differential mechanism of the type having gearing and including differential side gears mounted in the differential casing with clutch means associated with the side gears and a preload biasing means for the clutches including springs mounted within a retainer assembly with lubricant deflecting means formed on the retainer adapted to deflect lubricant toward said clutch means and thereby deliver lubricant to the clutch means.

SUMMARY OF THE INVENTION

In limited slip differential mechanisms to effect restrained differentiation, friction clutch means are provided to produce a direct driving connection between the output shafts and the differential case. Various forms of clutch means are used and may include a cone clutch mechanism between the output shafts and the differential case or may include a plurality of friction discs certain of which are drivingly connected to the output shafts from the differential and certain of which are drivingly connected to the differential case. Means are provided to maintain a resilient force on the clutch mechanisms to insure a constant resistance to differentiation. Additionally, means may be provided to increase the clutch engaging force with the torque input. Differential action will cause relative movement of the output shafts with respect to the differential case. Therefore a corresponding slippage or relative movement of the clutch discs or cones must occur which results in wear which may cause excessive wear or damage to the clutch cone or disc surfaces.

Accordingly, the present invention is directed to an improved differential mechanism of the described type in which the means providing the predetermined resilient force on the clutch discs or cones through the medium of the side gears includes a lubricant deflecting structure which will force lubricating fluid to flow toward the clutch means and thereby deliver the lubricating fluid to the clutch mechanisms.

DESCRIPTION OF THE DRAWINGS

The advantages of the present invention will become apparent with reference to the following description and accompanying drawings. In the drawings FIGURE 1 is a revolved sectional view of a differential mechanism employing the features of the present invention;

FIGURE 2 is an end view of one of the differential side gears;

FIGURE 3 is an end view of one of the clutch hub elements of FIGURE 1;

FIGURE 7 is a sectional view of a differential mechanism embodying a modified form of the present invention;

FIGURE 8 is an isometric view of one of the spring-retaining and gear contacting elements of FIGURE 7;

FIGURE 9 is a partial sectional view taken along the line 9—9 of FIGURE 7; and

FIGURE 10 is a partial sectional view of a modified form of spring-retaining and gear contacting elements for the differential mechanism of FIGURE 7.

Figure 4:
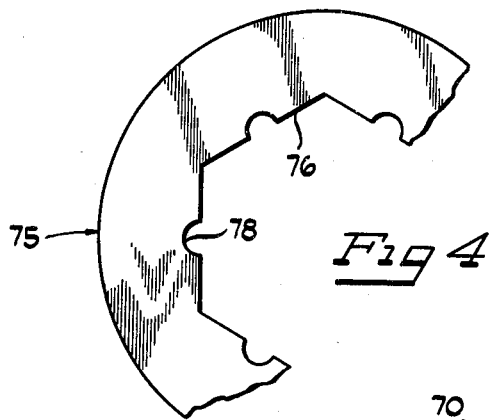
FIGURE 4 is an end view of one of the clutch discs which is connected to the clutch hub element.

Very generally, the present invention is directed to an improved form of limited slip differential mechanism which includes improved lubrication facilities for the relatively movable frictionally engaged surfaces of the differentiation resisting clutch components. In the invention as illustrated in FIGURE 1, lubrication paths are provided which extend through the side gears of the differential to allow flow of lubricant in a direction generally parallel to the longitudinal axis of the output shafts. Further, the lubrication path delivers lubricant oil radially inwardly of the clutch components to provide for centrifugal force aiding the flow of lubricant to the clutch components.

Referring specifically to FIGURE 1 there is shown a differential mechanism 10 including a pair of coaxially disposed relatively rotatable output shafts 11 which are adapted to transmit rotational effort to load receiving members (not shown) such as the driving wheels of an automotive vehicle. These shafts include adjacent inner splined ends 13 which are disposed in spaced apart juxtaposed relation.

The differential mechanism 10 including a differential casing 17 is interposed between the shafts 11 in overlying relation to the splined ends 13 and is adapted to transmit rotational effort to the shafts while allowing relative rotational movement between them when necessary.

The casing 17 is formed by a pair of cooperating generally cup-shaped sections comprising a flange section 19 and a cap section 21 which include generally cylindrical wall portions 23 disposed in abutting relation along a parting line 25. These sections are retained in abutting relation as by bolts 27 with the exterior surface of the walls defining a portion of the exterior of the casing and interior surface of the walls defining a cavity 29 surrounding each of the output shafts 11.

Each of the sections 19 and 21 includes a shaft opening defined by a longitudinally elongated hub 31 centrally disposed in the transverse end of that section which receives the respective shaft 11.

A side port 33 (FIGURE 1) formed by laterally mating rectangular openings in each of the casing sections at their abutting ends extends through the casing wall to allow oil or other lubricant to enter the interior of the cavity 29. In addition, at least one lubricant pocket 35 is provided on the interior of the cavity formed by the casing walls to provide a reservoir to collect quantities of lubricant during rotation of the casing. These pockets are formed by laterally mating depressions in the interior of the casing section at the abutting ends of the sections.

It should be understood that the number of side ports 33 and lubricant pockets 35 provided in the differential mechanism shown are merely illustrative and may be varied without departing from the scope of the invention.

The flange section 19 of the casing 17 includes a radially directed flange 39 extending about its exterior periphery to which is secured a ring gear 41 shown in phantom lines which is adapted to receive rotational effort from an associated drive line system (not shown) for transmission to the output shafts 11.

To effect transmission of rotational effort to the output shafts 11 while allowing for relative rotational movement between shafts, a bevel gear system is provided within the differential casing 17.

The bevel gear system includes a pair of side gears 43 each of which is connected to one of the ends 13 of the shafts 11 to transmit rotational effort thereto. The gears include splined inner bores which receive splines 24 of the shafts 11. The gears therefore are axially movable with respect to the shafts, and are rotatable therewith.

The bevel gear system further includes a pair of pinion gears 49 (only one of which is illustrated in the drawing) rotatably supported by a transversely extending pinion shaft 51. These gears are spaced equidistant from the longitudinal centerline of the output shafts 11 in intermeshing engagement with the side gears 43. The pinion shaft 51 extends transversely of the differential casing 17 between the side gears 43. The pinion gear 49 is shown in phantom lines only since the cross-section of FIGURE 1 is taken through a section which advantageously shows the details of the clutch structure to be described but does not intersect one of the pinion gears 49.

It is preferred that the teeth of the pinion gears and side gears be of a configuration such that transmission of torque from the housing, pinion shaft, and pinion gears to the side gears results in a substantial axial force component parallel to the output shafts tending to separate the side gears. The purpose of this relationship will become apparent shortly.

When rotational effort is received by the differential casing 17 from the drive line system (not shown) the casing is caused to rotate about the longitudinal centerline of the output shafts 11. Such action causes the pinion shaft 51 to revolve in a plane perpendicular to the output shaft centerline causing the pinion gears 49 to traverse a circular path about the output shafts. As the pinion gears 49 are interconnected with the side gears 43, rotational movement of the pinion gears with respect to the output shafts in turn causes the side gears to rotate about the axis of the output shafts. This rotation is transmitted through the splined ends 13 of the output shafts to the load receiving members.

When differential action is required, as when a vehicle is cornering or when any other condition exists wherein one driving wheel is required to make a greater number of revolutions than the other, the pinion gears not only revolve about the output shafts 11 but also rotate upon the pinion shaft 51 allowing relative movement between side gears and, consequently, relative rotation between shafts 11.

Under certain circumstances, the ability of the differential mechanism to provide for relative rotation between output shafts is a disadvantage rather than an advantage. For example, when one driving wheel of a vehicle is on slippery pavement and the other is on dry pavement, free differential action prevents the transmission of rotational effort to the wheel having the traction. The side gear associated with the wheel having the traction would remain stationary and the pinion gears would revolve about it in their circular path about the output shafts and simultaneously rotate about the pinion shaft 51 resulting in rotation of only the wheel without traction. To overcome this inherent operational characteristic, the differential mechanism 10 of the illustrated embodiment is provided with means for resisting differential action to the extent that an initial predetermined rotational effort will be applied to the wheel having the greater traction and to the extent that an additional cumulative rotational effort will be applied to the wheel having the greater traction as a function of input torque to the differential mechanism.

As best seen in FIGURE 1, there is provided within the cavity 29 a pair of disc clutch mechanisms 55 including a clutch hub element 56 having a pilot section 57 rotatable in the differential casing 17. Each of the hub elements 56 is provided with a splined inner bore which engages the splined end 13 of one of the output shafts 11 so that the hub element 56 is rotatable with the shaft. The clutch hub element as shown in FIGURE 3 has an external hexagonal surface 58.

Figure 5:
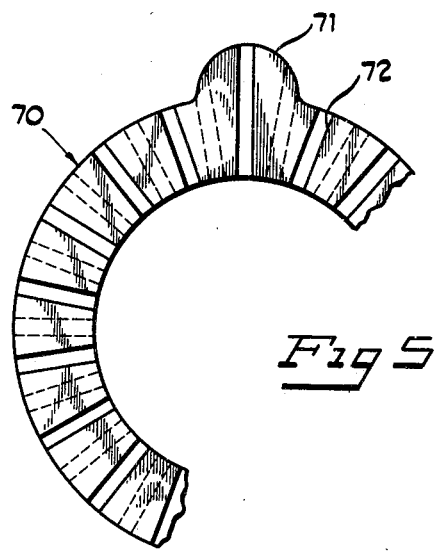
FIGURE 5 is an end view of one of the clutch discs drivingly connected to the differential case.

Provided in the differential casing 17 is a pair of circular shaped grooves 60 for each of the clutch mechanisms 55. The pair of grooves 60 for each of the clutch mechanisms 55 are arcuately disposed within the differential casing 17 and spaced approximately 180° apart. The differential casing and the clutch hub element 56, by means of grooves 60 and hexagonal surface 58, may be drivingly connected by clutch discs. A series of clutch discs 70 is provided as illustrated in FIGURES 1 and 5. The clutch discs 70 include a pair of tangs 71 disposed 180° apart which engage in the grooves 60 provided in the differential casing 17. A series of radially extending grooves 72 is provided on the clutch discs 70 which is adapted to contain and conduct lubricant for the clutch discs.

Interleaved with the clutch discs 70 is a series of clutch discs 75 illustrated in FIGURES 1 and 4. The clutch discs 75 illustrated in FIGURES 1 and 4 have an internal hexagonal surface 76 complementary to the surface 58 on the hub elements 56. Thus the clutch discs 75 are drivingly connected to the hub elements 56. Also provided in the clutch discs 75 in each of the six straight-line sections of the surface 76 are grooves 78 which aid in the flow of lubricant between the clutch discs.

The inwardmost clutch disc 70 on each side of the differential mechanism abuts one of the side gears 43 so that axial movement of the side gears toward the clutch mechanisms 55 will engage the clutches 55.

As the clutch hub elements 56 are splined to their respective output shafts 11, engagement of the clutch mechanisms 55 provides a means for transmission of rotational effort directly from the differential casing to the shafts 11. Such a direct driving connection insures the transmission of a predetermined rotational effort to each of the output shafts independent of the tractive condition associated with the output shafts. In this manner differentiation is retarded to the extent of the frictional engagement capacity of the clutch members.

Frictional engagement of the clutch members is accomplished in two ways. First, an initial preload of the clutch members into frictional driving engagement is provided by a spring pack assembly extending between the side gears 43 and overlying the transverse pinion shaft 51. The spring pack assembly includes a pair of gear contacting members 80 each of which includes a transverse face in contact with one of the side gears. The gear contacting members are urged outwardly by a plurality of compressed coil springs 81 which may be equally distributed on either side of the pinion shaft 51 to insure uniform load application upon the contacting members and consequently the side gears 43.

The outward force applied to the side gears 43 by the spring pack is in turn transferred to the clutch mechanisms 55 urging them into frictional engagement to provide an initial frictional driving relation to transmit at least a minimum rotational effort from the casing 17 directly to the output shafts 11. The number of springs used in the spring pack and their size and spring rate may be varied to alter the preload on the clutch members to achieve the operational characteristics desired for a particular application.

In addition to the initial preload of the clutch members provided by the spring pack assembly, lateral separating forces between the pinion and side gears further contribute to the degree of frictional engagement between clutch components. As the torque input to the differential mechanism increases the separating force upon the pinion and side gears also increases, thus increasing the axial force exerted on the clutch mechanisms by the side gears. In this manner the clutch mechanisms are urged into further frictional engagement to provide a cumulative increase in the degree of restraint of differential action.

As explained, in certain instances, relative rotation between output shafts is necessary to accomplish certain desired results, such as when a vehicle negotiates a corner, or curve wherein one drive wheel must turn at a faster rate than the other. In these circumstances it is necessary that the frictional engagement between the clutch discs be overcome so that relative movement between shafts may be effected. When this occurs, the clutch discs must, of necessity, slip with respect to one another to allow relative movement of one shaft with respect to the other. Additionally, when one drive wheel loses traction, the clutch discs of one clutch mechanism slip rapidly in opposite directions to the other clutch mechanism. This is true even though the axial forces imparted to the clutches by the side gears are relatively great.

As can be appreciated, excessive slippage between the clutch components, more particularly the clutch discs, may cause serious damage to the contacting surfaces and may result in premature failure of the differential mechanism.

To prevent the occurrence of such adverse consequences improved lubrication facilities are provided which provide the contacting surfaces of the clutch mechanisms with lubricant to reduce the coefficient of friction between the contacting surfaces and also aid in the dissipation of heat generated during differential action.

In accordance with the present invention and as seen in FIGURES 1 and 2 the side gears 43 are provided with a plurality of lubricant access means or passages 84 which, for example, may be four in number which extend through the side gears 43 on an angle to the axis of the output shafts 11. The passages 84 intersect the surface on the side gears 43 on the side toward the clutch mechanisms 55 in the area of the hexagonal surface 58 of hub elements 56 and thus cooperate with grooves 78 in clutch discs 75.

Figure 6:
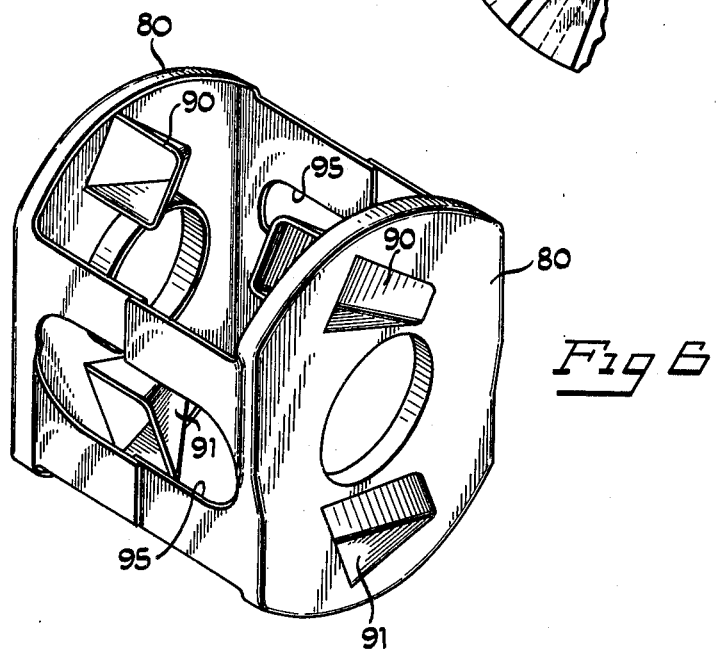
FIGURE 6 is an isometric view of the spring-retaining and gear contacting elements of FIGURE 1.

As illustrated in FIGURES 1 and 6, the spring retainers and gear contacting members 80 are each formed with a pair of lubricant scoops 90 and 91.

The members 80 are formed of sheet metal material so that the lubricant scoops 90 and 91 may be manufactured economically by a sheet metal cutting and forming process to the shape desired although other alternative forms may be used. As shown in FIGURE 6, the scoops 90 extend in an arcuate direction with respect to the axis of the output shafts 11 in opposite direction to the scoops 91.

The members 80 may be formed with additional numbers of lubricant scoops as long as certain of these scoops extend in each arcuate direction with respect to the shafts 11.

As can be seen in FIGURE 1, in which scoops 91 are illustrated, the scoops are radially located so as to be in cooperative relationship with the opening of lubricant passages 84 on side gears 43 on the side toward members 80. Members 80 include recesses 95 which when the members 80 are assembled in the differential mechanism, receive pinion shaft 51, thus members 80 rotate with the differential casing 17 and pinion shaft 51.

As the differential casing 17 rotates, members 80 will rotate therewith and, depending upon the direction of rotation with lubricant scoops 90 or oil lubricant scoops 91, will operate to deflect oil within the cavity 29 into the lubricant passages 84 through side gears 43. The lubricating fluid will then be conducted along the hexagonal surfaces 58 through grooves 78 formed in clutch discs 75. As seen in FIGURE 1, a clearance is provided between the inside bore diameter of clutch discs 70 and surfaces 58 to allow flow of lubricant along surfaces 58. With the aid of centrifugal force the lubricating fluid will then be distributed through each of the radially extending grooves 72 in clutch discs 70. Thus each of the frictional contacting surfaces of the clutch mechanisms 55 are provided with an increased flow of lubrication depending upon the speed of rotation of the casing 17.

Each of the sections 19 and 21 has an annular lubricant groove 97 formed on the interior portion of the end walls. Further, the end walls of sections 19 and 21 are provided with axially extending ports 98 which extend from the area of the clutch mechanisms 55 to the external surfaces of the casing 17. Some of the lubricant flowing along surface 58 through grooves 78 will thus enter grooves 97 to provide a reservoir of lubricating fluid for the clutch mechanisms. The lubricating fluid can also flow out through ports 98 into the casing containing the differential mechanism 10 from which it may return to the cavity 29 of the differential casing through the port 33. From the above it will be apparent that an improved flow of lubrication is provided for the clutch discs of the differential mechanism by the use of scoops rotating with the differential casing which will deflect or impel fluid through the lubricating path through the side gears. The present invention advantageously delivers the lubricating fluid radially inwardly of the clutch mechanisms so that centrifugal force will insure distribution of the lubricating fluid throughout the clutch mechanisms.

Since oil lubricant scoops of opposite hand are provided on the members 80 the lubricant scoops will be operative to lubricate the clutch mechanisms in either direction of rotation of the differential casing 17, and extended differentiation may occur without serious wear or damage to the clutch components since the lubricant scoops will be operative for all conditions of differential action.

Referring to FIGURES 7, 8 and 9, a modified form of the invention is illustrated. Parts of the differential mechanism 110 of FIGURE 7 which are identical to the elements of the structure of FIGURE 1 have the same numeral with the exception that the numbers are in the 100 series. The differential mechanism of FIGURE 7 operates in a similar manner to that of FIGURE 1 in that an initial preload of the clutch mechanisms 155 is provided by the spring pack assembly comprising coil springs 181 and the spring retainer and gear contacting members 180. In addition, lateral separating forces between the pinion and side gears which increases as the torque input to the differential mechanism increases, contribute to the degree of frictional engagement of the clutch mechanisms 155 to restrain differential action.

In general, the differential mechanism of FIGURE 7 utilizes cone clutch mechanisms 155 as distinguished from the disc clutch mechanisms 55 of the FIGURE 1 structure. Cone clutch mechanisms 155 include conical clutch surfaces 210 formed in the interior of the differential case 117 on either side thereof. Cone clutch members 211 are provided splined to output shafts 111 to rotate therewith. Clutch members 211 have an external conical clutching surface 212 which has threaded lubricant groves 213 formed therein to provide improved lubrication to the clutch surfaces. The preload thrust provided by springs 181 and gear contacting members 180 urges the side gears 143 apart into engagement with cone clutch members 211 to provide for frictional engagement between the conical clutch surfaces 210 and 212.

As can be seen in FIGURES 7 and 9, at least one axially extending lubricant access means or groove 215 is provided in each of the conical clutch surfaces 210 in differential casing 117. The grooves 215 are for the purpose of maintaining a reservoir of lubricant to provide increased lubricating qualities in the differential mechanism. The structure and operation of the grooves 215 is more particularly described in copending application Ser. No. 463,183, filed June 11, 1965 of common assignee.

The gear contacting and spring retaining members 180 comprise a generally flat plate section 220 having a pair of centrally disposed arms 221 on either side thereof extending perpendicular to the plate section 220. The arms 221 include semicircular recesses 224 so that when two of the members 180 are assembled in the differential as illustrated in FIGURE 7, an opening is provided to receive the pinion shaft 151 so that spring pack assembly 181 and members 180 rotate with the differential casing 117. Formed in the flat plate section 220 are a plurality of circular bosses 225 which serve to center and locate the springs 181 in the differential assembly. An axial bore 227 is provided in each of the members 180 to provide clearance for the ends of the axial shafts extending into the differential mechanism.

The improved clutch lubricating structure of the differential 110 of FIGURE 7 includes a lubricant-deflecting baffle 240 formed on the spring retaining and gear contacting members 180 on one end thereof and remote from the central bore. As illustrated in FIGURE 8 the baffles are formed on the lower portion of the plate section 220 and extend in a direction similar to the arms 221, perpendicular to the flat plate section 220. The baffles 240 may be of varying size and shape so as to properly be accommodated in different sizes and styles of differential assemblies. The members or retainers 180 and coil springs 181 are assembled into the differential mechanism with the baffles 240 being located arcuately as illustrated in FIGURE 9 exactly opposite the oil grooves 215 in the differential case.

The baffles 240 are conveniently formed on the sheet metal members 180 by stamping out the member 180 to the desired shape and bending baffles 240 perpendicular to the flat plate section 220.

The baffles 240 act as a lubricant-deflecting device when the differential case 117 is rotating and lubricant flows into the differential case through the side port 133. The baffles 240 serve to deflect the lubricant into the axial grooves 215 to keep the grooves 215 well supplied with the lubricant. The members 180 rotate with the differential case so that whenever the differential case 117 is rotating the lubricant deflecting action will be taking place. It will be apparent that other forms of baffles may be formed on the members 180 having various shapes and configurations which would operate in a similar manner to that illustrated in FIGURES 7 and 8 to deflect lubricant into the grooves, the only requirement being that the deflecting structure be located so as to be near the grooves in the differential case and situated on a part which rotates with the differential case.

Referring to FIGURE 10, a modification of the invention of FIGURE 7 is illustrated in which the lubricant-deflecting means comprises a baffle 240a is formed only on one of the members 180. The baffle 240a extending radially to a point adjacent the other member 180. The single baffle 240a will operate as the baffles of FIGURE 7 to deflect lubricant into the lubricating grooves 215.

Various features of the invention have been particularly shown and described; however, it should be obvious to one skilled in the art that various modifications may be made therein without departing from the scope of the invention.

What is claimed is:

1. A limited slip differential mechanism comprising a gear case having gearing therein and including differential side gears mounted in the casing, clutch means operatively associated with said side gears, preload biasing means engaging said gears so as to provide a predetermined engaging force for said clutch means, said preload means adapted to rotate with said casing, lubricant access means in operative communication with said clutch means, lubricant-deflecting means on said preload means adapted to deflect lubricant in said casing toward said access means to provide lubrication for said clutch means.

2. A differential mechanism as claimed in claim 1 wherein said preload means comprises resilient means and retaining means for said resilient means, said lubricant-deflecting means being integral with said retaining means.

3. A differential mechanism as claimed in claim 2 wherein said lubricant-deflecting means comprises at least one scoop formed in said retaining means.

4. A differential mechanism as claimed in claim 2 wherein said lubricant-deflecting means comprises at least one baffle extending generally perpendicularly from said retaining means.

5. A differential mechanism as claimed in claim 2 wherein said access means comprises a lubricant delivery passage extending through each of said side gears adapted to deliver lubricant to said clutch means, said lubricant-deflecting means comprising a scoop formed in said retaining means, said scoop adapted to deliver lubricant to said passage extending through said side gear wherein as said differential casing rotates adequate flow of lubricant to said clutch means is provided.

6. A limited slip differential mechanism comprising a casing adapted to receive an input torque for transmission to a pair of coaxially aligned relatively rotatable output shafts, gearing in said casing including a pair of axially aligned side gears, clutch means between said side gears and said casing, preload means adapted to engage said side gears and urge said side gears in a direction to engage said clutch means, and said side gears having lubricant passages therethrough and adapted to deliver lubricant to said clutch means, said preload biasing means including lubricant-deflecting means thereon said preload means adapted to rotate with said casing whereby when said casing rotates said lubricant-deflecting means will deliver lubricant fluid to said side gear passages whereby adequate flow of lubricant to said clutch means is provided.

7. A differential mechanism as claimed in claim 6 wherein said clutch means comprising at least one disc clutch mechanism which when engaged is adapted to clutch one of said output shafts and side gears to said casing.

8. A limited slip differential mechanism comprising a rotatable casing adapted to receive an input torque for transmission to a pair of coaxially aligned relatively rotatable output shafts, gearing in said casing including a pair of axially aligned side gears, clutch means between said side gears and said casing, said side gears including at least one lubricant delivery passage extending therethrough from the interior of the differential mechanism to a point radially inwardly of the clutch means, means rotating with said casing adapted to deliver lubricant to said passages whereby lubricant will be delivered to the clutch means and will be distributed with the aid of centrifugal force when the differential casing is rotated.

9. A limited slip differential mechanism comprising a gear casing adapted to receive an input torgue for transmission to a pair of coaxially aligned relatively rotatable output shafts, clutch means between at least one of said output shafts and said casing, lubricant access means in operative communication with said clutch means, insertable means for insertion in said casing to provide a geared relationship between said casing and said output shafts, said insertable means including a shaft member having a pair of pinion gear members rotatable thereon, a pair of side gear members engaging said pinion gears and said clutch means and adapted to be drivingly connected to said output shafts, and a resilient preload member engaging said side gears and urging same toward said clutch means said insertable means further including lubricant-deflecting means on one of said members adapted to deflect lubricant in said casing toward said access means as said casing rotates to provide lubrication for said clutch means.

10. A differential mechanism as claimed in claim 8 wherein said lubricant-deflecting means is integral with one of said members.

11. A limited slip differential mechanism comprising a casing adapted to receive an input torque for transmission to a pair of coaxially aligned relatively rotatable output shafts, gearing in said casing including a pair of axially aligned side gears, clutch means between said side gears and said casing, preload means comprising a pair of retaining means having resilient means extending therebetween said retaining means engaging said side gears to provide a predetermined engaging force for said clutch means, lubricant-deflecting baffle formed on at least one of said retaining means and extending therefrom toward said other retaining means, said retaining means rotating with said casing whereby said baffle will deflect lubricant

12. A differential mechanism as claimed in claim 11 wherein said clutch mechanism comprises at least one cone clutch having a conical friction surface formed in said casing and a lubricant groove in said friction surface extending axially in said casing, and said baffle being located in proximity to said lubricant groove so as to deflect lubricant in said casing into said groove.

13. A differential mechanism as claimed in claim 11 wherein said retaining means has a central bore therein, said baffle being formed on one end of said retaining means remote from said central bore.

References Cited

UNITED STATES PATENTS

| | | | |
|---|---|---|---|
| 3,182,527 | 5/1965 | Bryan | 184—11 XR |
| 3,224,299 | 12/1965 | Holdeman et al. | 74—711 |
| 3,264,901 | 8/1966 | Ferbitz et al. | 74—711 |
| 3,331,262 | 7/1967 | Mazziotti | 74—711 |
| 3,404,585 | 10/1968 | Roper | 74—711 |
| 3,448,635 | 6/1969 | Nelson | 184—6 |

FOREIGN PATENTS 1,150,593   6/1963   Germany.

FRED C. MATTERN, JR., Primary Examiner

MANUEL A. ANTONAKAS, Assistant Examiner

U.S. Cl. X.R.

74—711; 184—11